US012627211B2

(12) United States Patent
Herrin et al.

(10) Patent No.: US 12,627,211 B2
(45) Date of Patent: May 12, 2026

(54) TORQUE AUGMENTATION APPARATUS

(71) Applicants: Robert Herrin, Tampa, FL (US); Sean R. Khant, Tampa, FL (US)

(72) Inventors: Robert Herrin, Tampa, FL (US); Sean R. Khant, Tampa, FL (US)

( * ) Notice: Subject to any disclaimer, the term of this patent is extended or adjusted under 35 U.S.C. 154(b) by 29 days.

(21) Appl. No.: 18/780,599

(22) Filed: Jul. 23, 2024

(65) Prior Publication Data

US 2024/0380299 A1     Nov. 14, 2024

Related U.S. Application Data

(63) Continuation-in-part of application No. 17/326,509, filed on May 21, 2021, now Pat. No. 12,051,959, and a continuation-in-part of application No. 16/847,739, filed on Apr. 14, 2020, now Pat. No. 11,018,569.

(51) Int. Cl.
H02K 49/10     (2006.01)
H02K 1/27     (2022.01)

(52) U.S. Cl.
CPC .............. H02K 49/10 (2013.01); H02K 1/27 (2013.01)

(58) Field of Classification Search
CPC .......... H02K 49/10; H02K 1/27; H02K 53/00; H02K 49/102
See application file for complete search history.

(56) References Cited

U.S. PATENT DOCUMENTS

2005/0161304 A1*     7/2005     Brandl ................... F16H 1/125
192/223

FOREIGN PATENT DOCUMENTS

JP          2015180170 A    *    8/2015

* cited by examiner

*Primary Examiner* — Thomas Truong
(74) *Attorney, Agent, or Firm* — Distinct Patent Law; Justin P. Miller

(57)          ABSTRACT

The torque augmentation apparatus includes one or more plates fixed to a shaft. Adjacent to each plate, either on only one side of the rotor, or on both sides of the rotor, is placed a static spiral-shaped magnetic diversion plate. A collection of magnets is placed along the perimeter of the rotor on each side of the rotor that faces a static spiral-shaped magnetic diversion plate. The rotor is perpendicular to the shaft, with rotation of the rotor causing rotation of the shaft. The shaft has an input side that is connected to a driver, such as an electric motor. The shaft further has an output side connected to a load, such as a generator. During rotation of the shaft by the external driver the interaction of the magnets on the rotor and the static spiral-shaped diversion plate results in a torque vector that is perpendicular to the shaft.

19 Claims, 15 Drawing Sheets

TORQUE AUGMENTATION APPARATUS

RELATED APPLICATIONS

This application is a continuation-in-part U.S. patent application Ser. No. 17/326,509 titled Torque-increasing device, filed May 21, 2021, issued Jul. 30, 2024, as U.S. Pat. No. 12,051,959, which is in-turn a continuation-in-part of U.S. patent application Ser. No. 16/847,739 titled Torque augmentation device, filed Apr. 14, 2020, and issued May 25, 2021, as U.S. Pat. No. 11,018,569.

FIELD

This invention relates to the field of mechanical devices producing rotational energy and more particularly to an apparatus that contributes torque to a rotating system.

BACKGROUND

Rotational mechanical energy is the workhorse of our world. From pumping liquids to moving trains, rotational motion is critical.

While horsepower is the metric most often cited when discussing the capability of a machine, it is torque that allows machines to accomplish their work. Without the torque to rotate, there is no work.

What is needed is a system for adding to the torque of a rotational system.

SUMMARY

The torque augmentation apparatus includes one or more plates fixed to a shaft. Adjacent to each plate, either on only one side of the rotor, or on both sides of the disc-shaped rotor, is placed a static spiral-shaped magnetic diversion plate. A collection of magnets is placed along the perimeter of the rotor on each side of the rotor that faces the static spiral-shaped magnetic diversion plate. The rotor is perpendicular to the shaft, with rotation of the rotor causing rotation of the shaft. The shaft has an input side that is connected to a driver, such as an electric motor. The shaft further has an output side connected to a load, such as a generator. During rotation of the shaft by the external driver the interaction of the magnets on the rotor and the static spiral-shaped diversion plate results in a torque vector that is perpendicular to the shaft, therefore adding torque to the rotation of the shaft.

The torque vector induces kinetic energy into the rotor, which is then utilized to detach from the attachment plate at the exit point of the magnet and attachment plate. This stored energy and the exit energy are theoretically the same. However, by using exit magnets or a transitional plate to guide the flux lines at the exit, the exit energy can be reduced.

This concept is similar to that of an air conditioning system. When gas is compressed it generates heat, and the decompression cools the gas. Theoretically, the energy and temperature remain the same. However, if you cool the compressed gas, it becomes colder than the ambient temperature upon decompression.

The direction of rotation of the rotor is such that the magnets continually see an associated face of the spiral diversion plate drawing closer as the rotor rotates. At the point where the spiral-shaped plate reaches the closest position with respect to the magnets, the spiral diversion plate steps or jumps away from the magnets. This discontinuity in the static spiral plate interrupts the interaction between the magnets and the spiral-shaped diversion plate. To smooth this discontinuity, or ease the transition between the spiral plate being at its closest position with the given magnet and its furthest position, a ramped or curved transition piece, or alternatively one or more magnets, is used to shape the magnetic field at the transition.

By shaping the magnetic field at the transition, the resistance created by the magnets transitioning from the close position of the spiral plate to the far position is reduced, and the resulting decrease in torque is correspondingly minimized, increasing the efficiency of the system.

While the preferred embodiment is as described, alternative embodiments are anticipated.

For example, permanent magnets are preferred, but electromagnets can be substituted.

Discrete permanent magnets are shown, but arc-shaped magnets can be substituted.

As shown in the drawings, the magnets are preferably placed in a Halbach arrangement, thus focusing the magnetic flux away from the rotor and plate faces.

For example, stacked atop each other, a typical Halbach arrangement of magnets is:

N-S magnet horizontal
N-S magnet vertical
S-N magnet horizontal

Magnetic flux is a measurement of the magnetic field that passes through a given area. The measurement and illustration of magnetic flux is used to understand and measure the magnetic field present across a given area. Flux lines are a visualization of the magnetic field.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
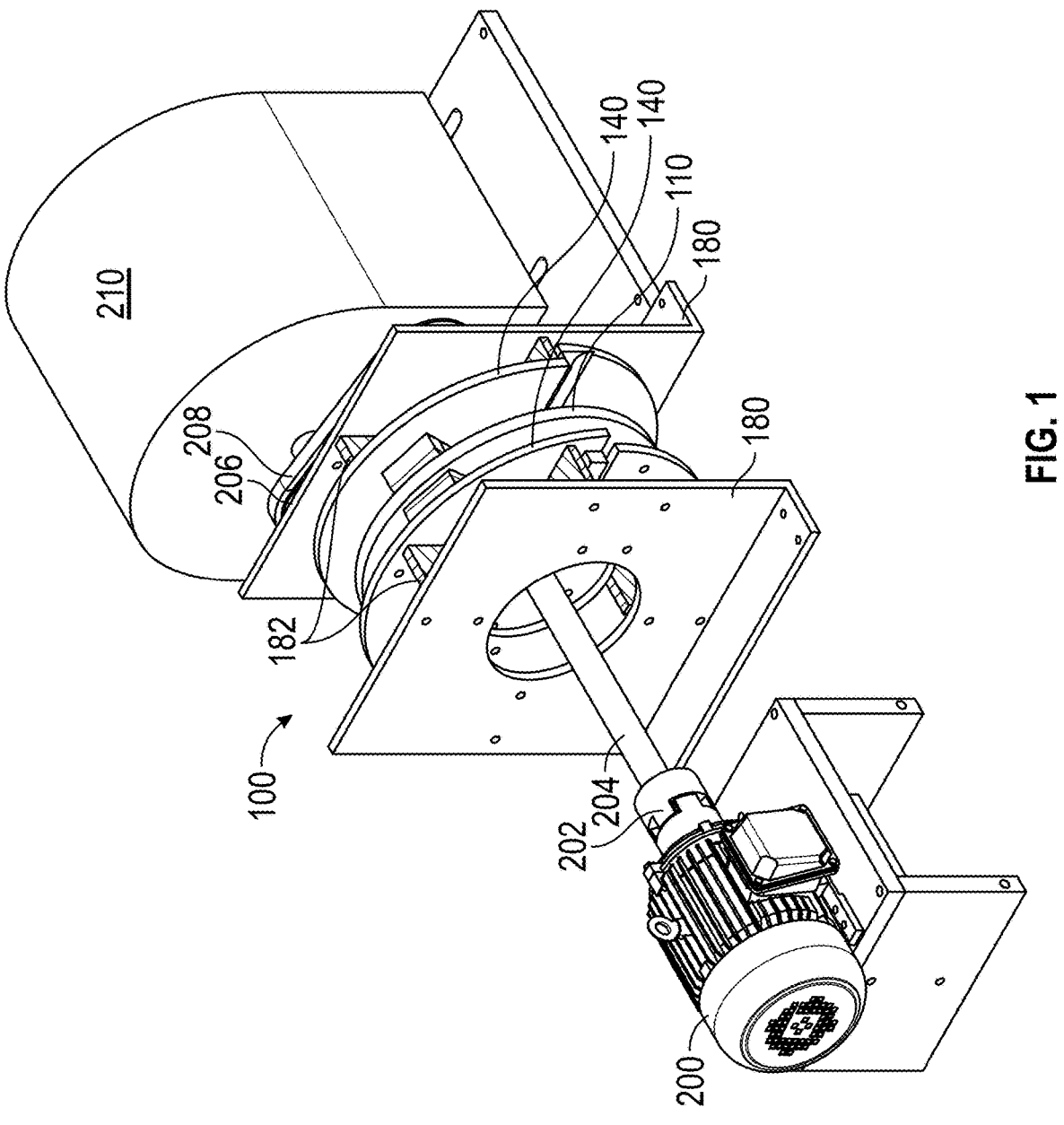
FIG. 1 illustrates an isometric view of the torque augmentation apparatus.

Reference will now be made in detail to the presently preferred embodiments of the invention, examples of which are illustrated in the accompanying drawings. Throughout the following detailed description, the same reference numerals refer to the same elements in all figures.

Referring to FIG. 1, an isometric view of the torque augmentation apparatus is shown.

The torque augmentation apparatus 100 is shown with a driver 200 attached via a coupling 202 to the shaft 204. The opposite end of the shaft 204 is connected via one or more pulleys 206 and belts 208 to a load 210.

The torque augmentation apparatus 100 includes the rotor 110 that is directly coupled to the shaft 204, therefore the rotor 110 rotates as the shaft 204 rotates.

One or more support plates 180 support one or more static spiral plates 140 via optional connecting plates 182. The connecting plates 182 are generally omitted in subsequent figures to avoid obscuring the internal mechanics of the torque augmentation apparatus 100.

Figure 2:
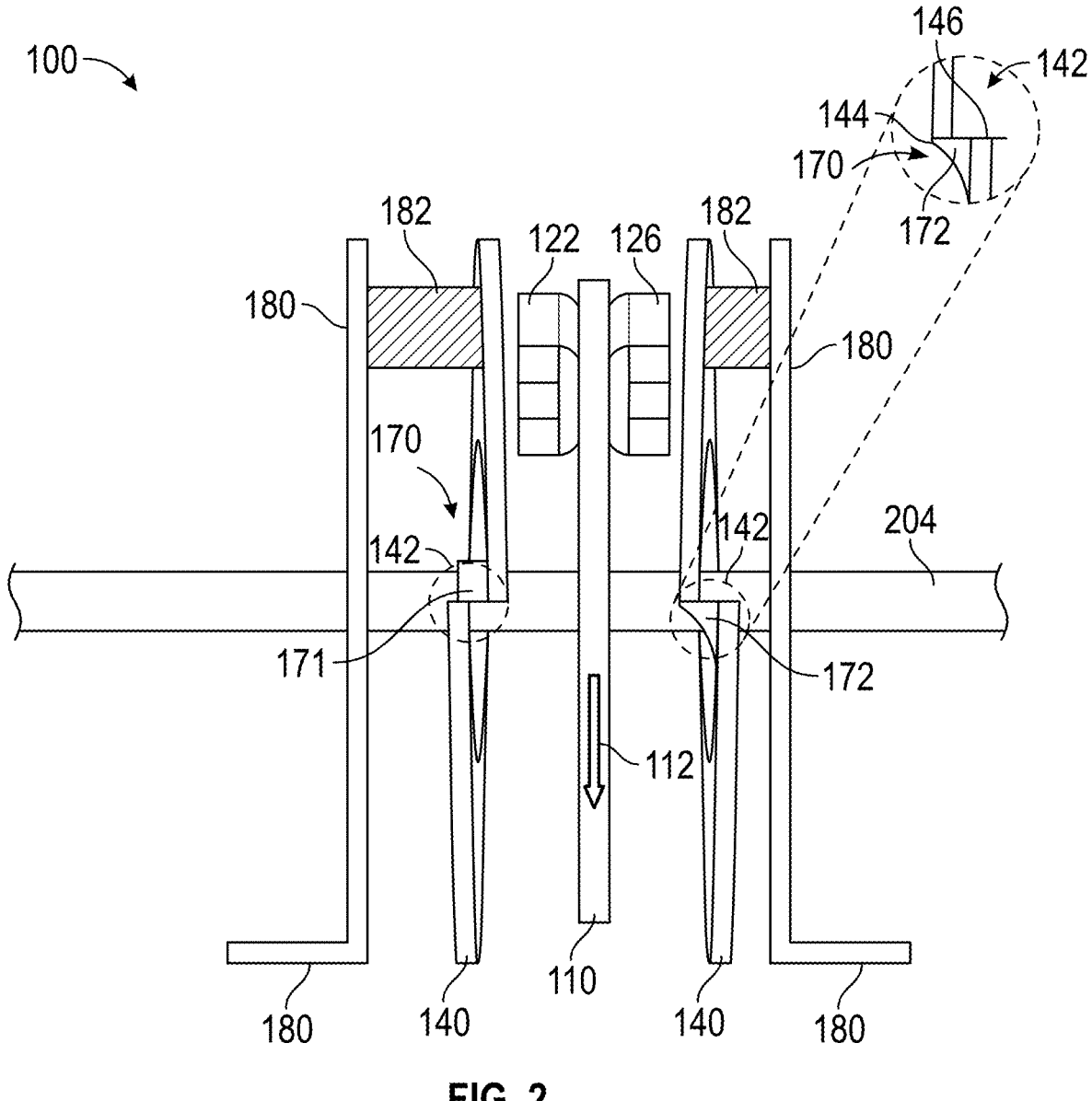
FIG. 2 illustrates a front view of the torque augmentation apparatus.
Figure 3:
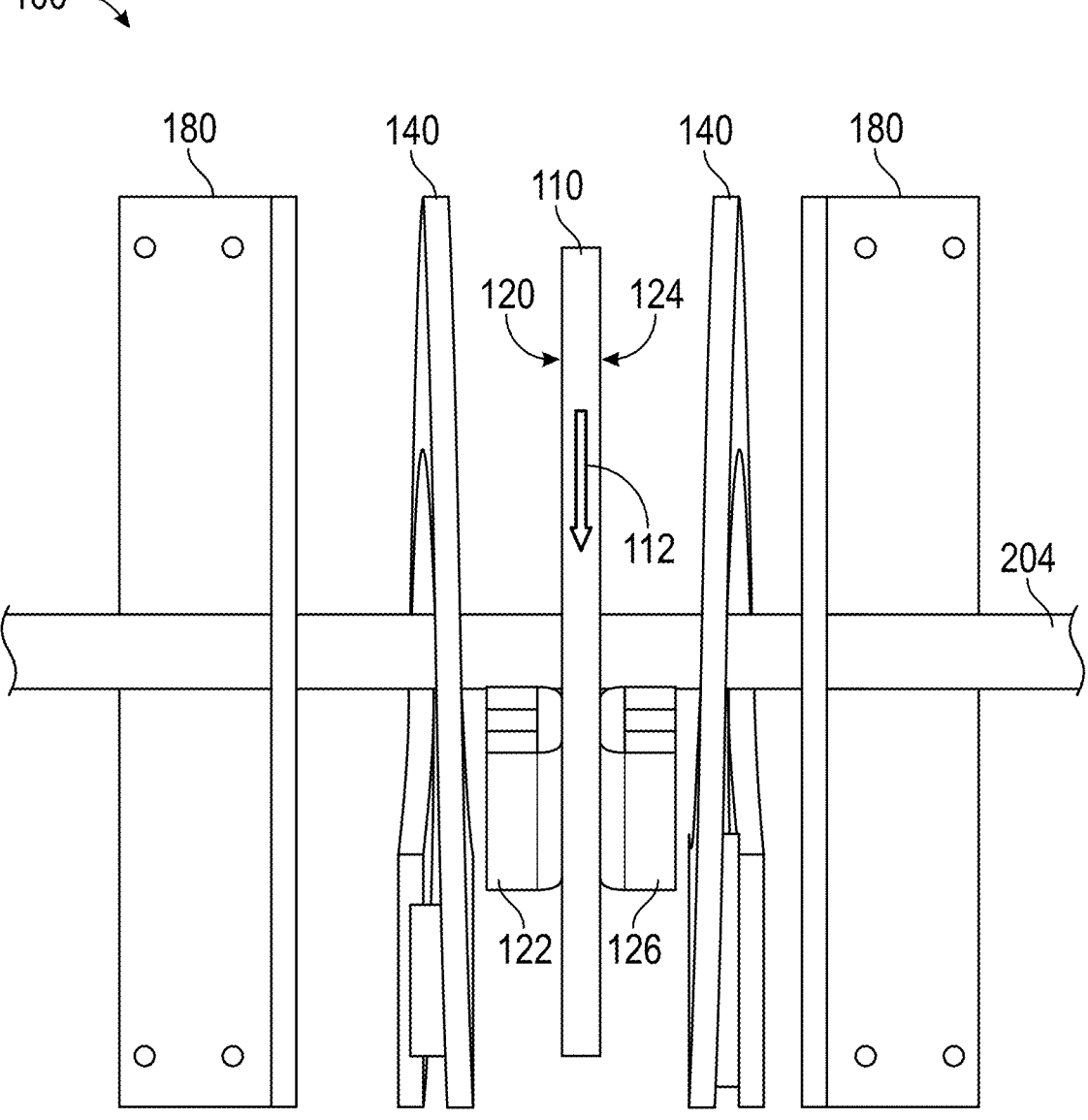
FIG. 3 illustrates a top view of the torque augmentation apparatus.

Referring to FIGS. 2 and 3, a front view and a top view of the torque augmentation are shown.

The torque augmentation apparatus 100 is shown with rotor 110 attached to shaft 204.

Figure 5:
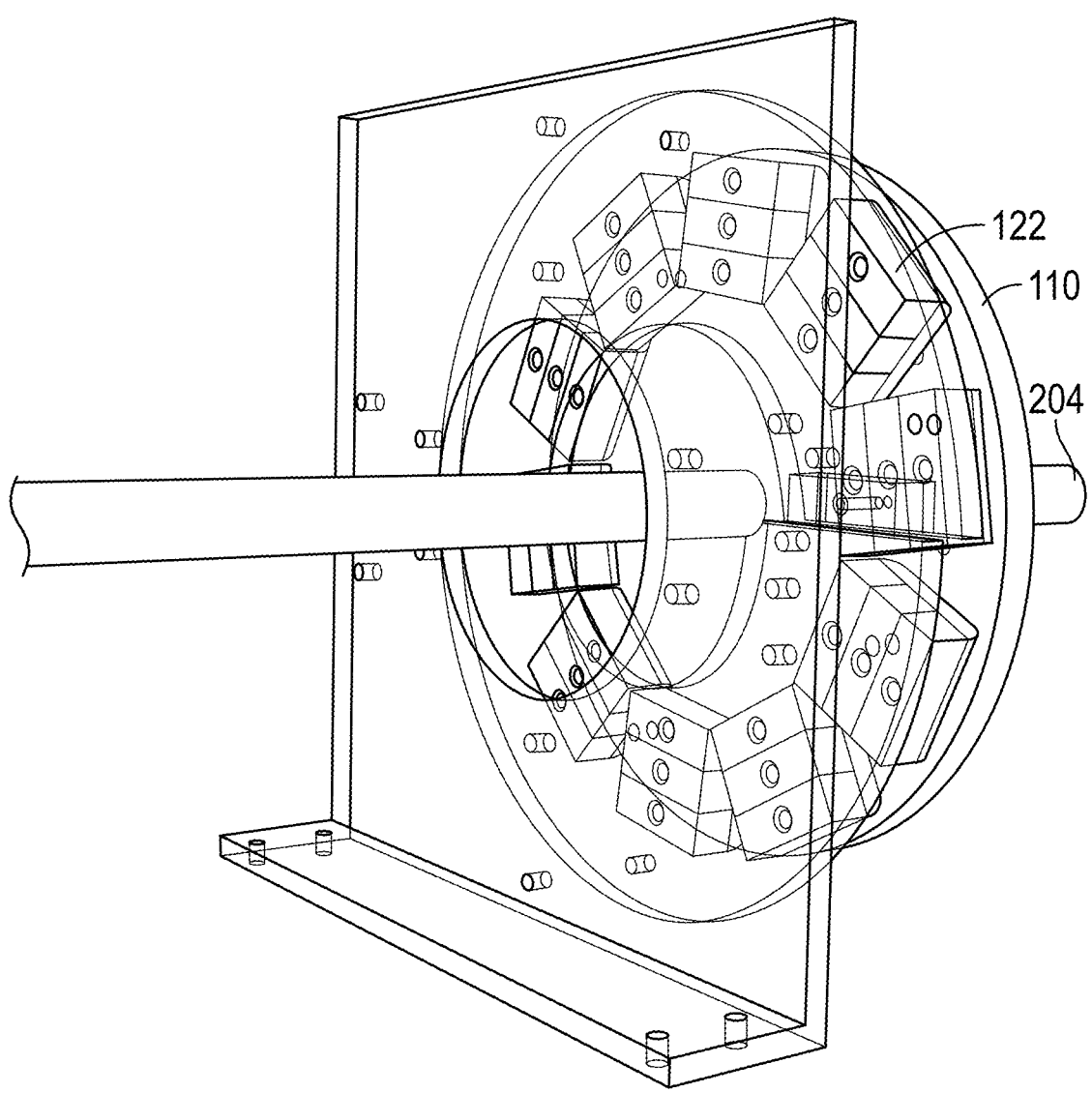
FIG. 5 illustrates a semi-transparent isometric view of the torque augmentation apparatus.

The rotor 110, moving in rotor rotation direction 112, includes a first face 120 and first magnet set 122, and a second face 124 with a second magnet set 126. For clarity, the first magnet set 122 and the second magnet set 126 are shown as only single magnet sets. FIG. 5 shows the first magnet set 122 patterned about the center axis at an increment of 36° with ten sets of magnets.

Support plates 180 are connected to the spiral static plate 140 via optional connecting plates 182.

The spiral static plate 140 is shown with two embodiments, the first embodiment including exit diversion magnets 171, the second embodiment including an exit diversion ramp 172.

The static spiral plate 140 has a plate discontinuity 142 between the exit end 144 and the entrance end 146. This is where exit diversion 170 is placed to ease the magnetic field transition between the ends.

Figure 4:
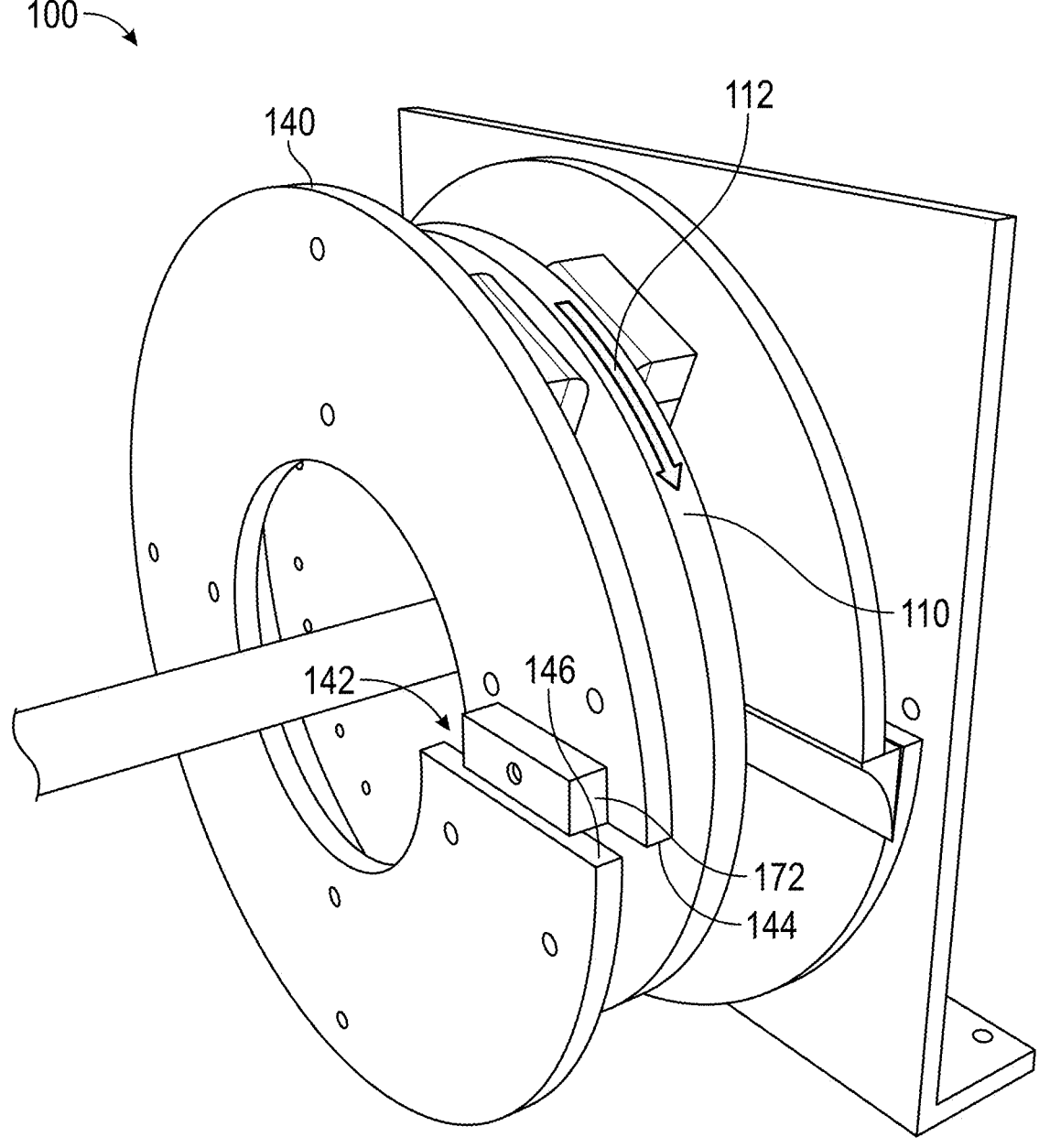
FIG. 4 illustrates a second isometric view of the torque augmentation apparatus.

Referring to FIG. 4, a second isometric view of the torque augmentation apparatus is shown.

The torque augmentation apparatus 100 includes rotor 110 with rotor rotation direction 112.

The static spiral plate 140 includes a plate discontinuity 142 at the break between the exit end 144 and the entrance end 146.

Referring to FIG. 5, a semi-transparent isometric view of the torque augmentation apparatus is shown.

The rotor 110, affixed to shaft 204, is shown with first magnet set 122 patterned about the central access of the rotor 110, which is coincident with the central axis of the shaft 204. In this figure, the first magnet sets are at 36° with respect to the adjacent magnet sets, resulting in a total of ten magnet sets.

Figure 6:
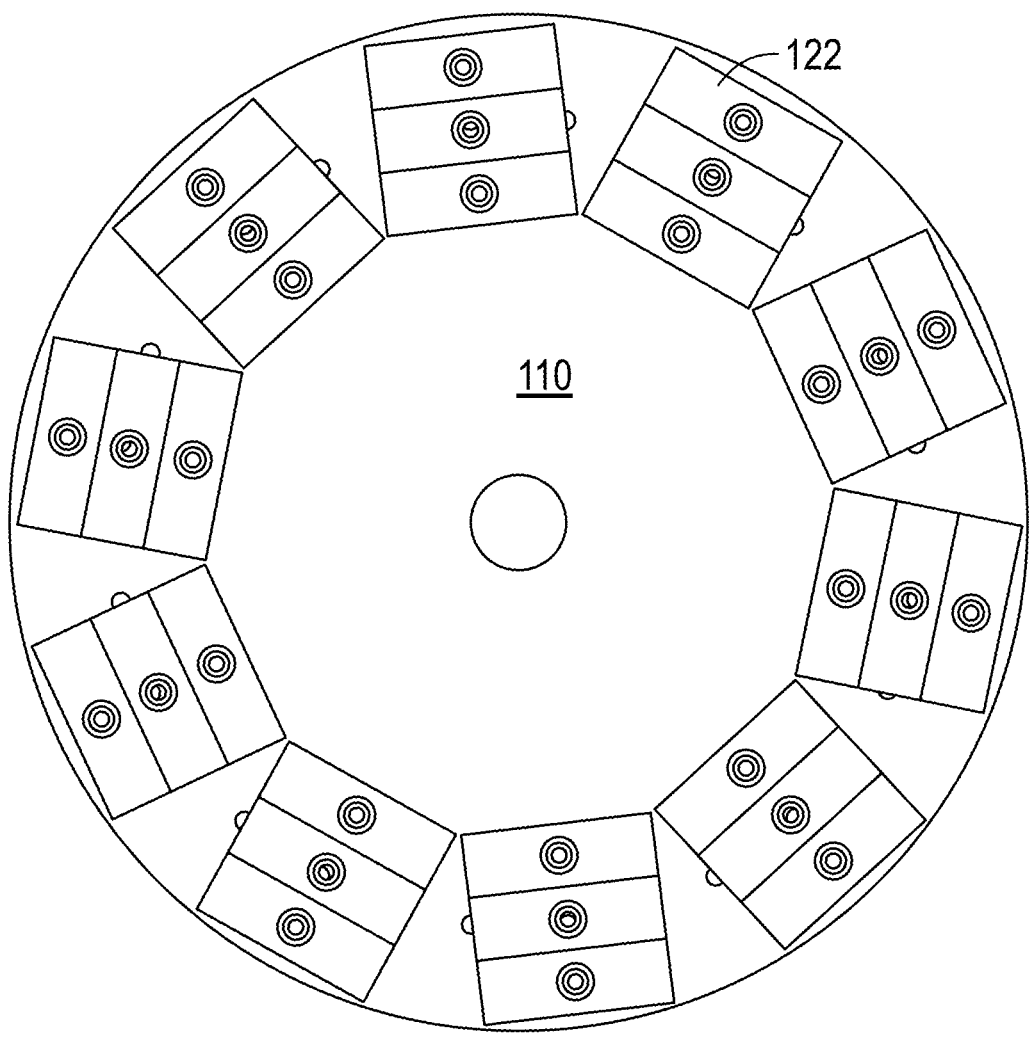
FIG. 6 illustrates a view of the rotor of the torque augmentation apparatus.

Referring to FIG. 6, a view of the rotor of the torque augmentation apparatus is shown.

Again shown is rotor 110 with first magnet set 122 patterned about the central access of the rotor 110 at 36° with respect to their the adjacent magnet sets, resulting in a total of 10 magnet sets.

Figure 7:
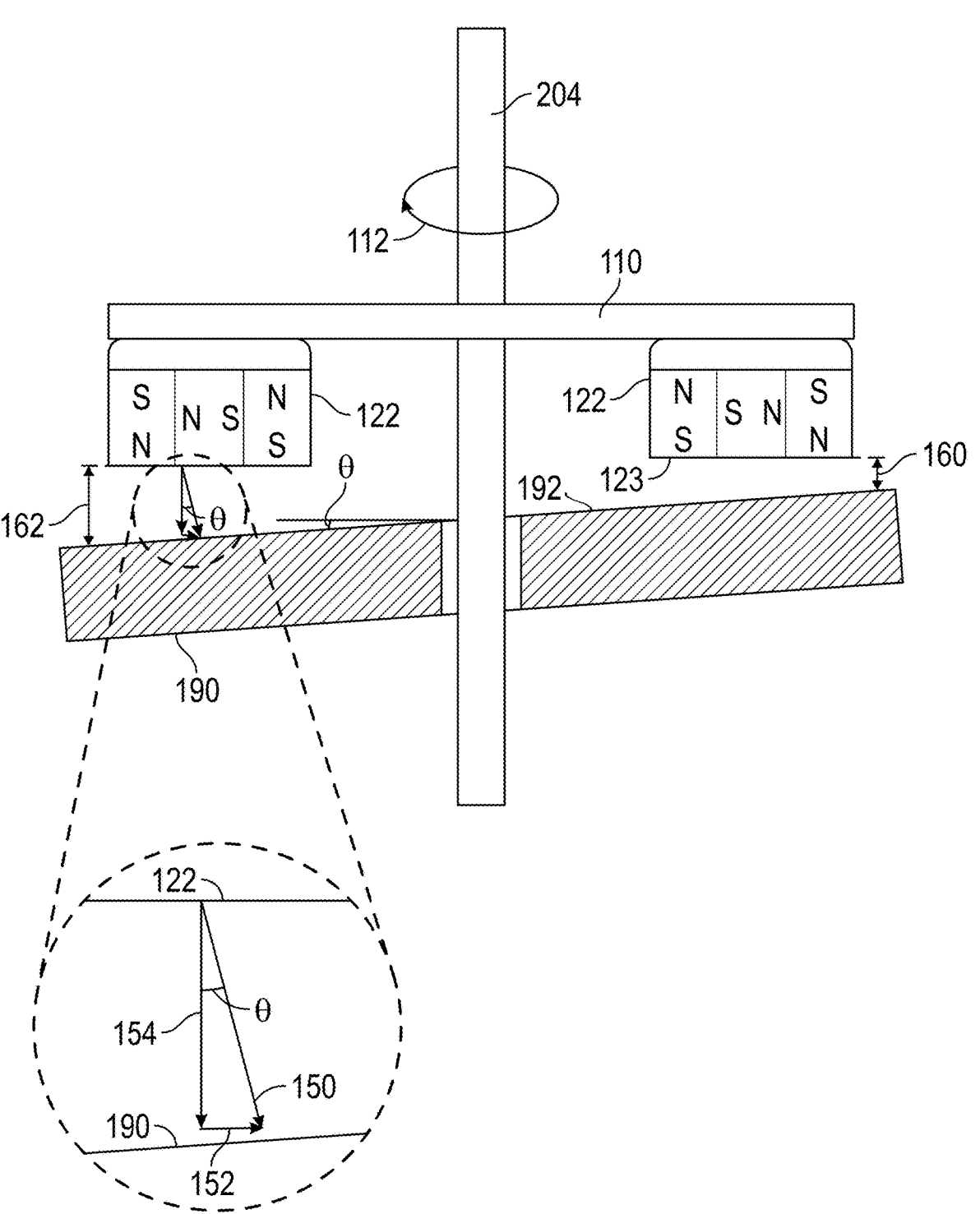
FIG. 7 illustrates a cross-section with a static flat angled plate of the torque augmentation apparatus.

Referring to FIG. 7, a cross-section with a static flat angled plate of the torque augmentation apparatus is shown.

The illustration of an angled flat plate 190 is included to explain the detriments associated with this alternative embodiment.

Shaft 204 supports the rotor 110, shown with two first magnet sets 122. As the rotor 110 moves in rotor rotation direction 112, the magnet sets 122 move with respect to the angled flat plate 190.

The angle between the face of the angled flat plate 190 and the line perpendicular to the rotor 110 is Θ, shown as approximately 4° in the figure. Carrying this angle Θ to the interaction between the first magnet set 122 and the angled flat plate 190, the primary attractive force is labeled as force toward plate 150. Dividing force toward plate 150 into its component parts results in rotational force 152 and attractive force 154. Using Θ as 4° as an example, rotational force 152 is approximately 7% of the force toward plate 150. In other words, the force between the first magnet set 122 and the angled flat plate 190 includes a component of approximately 7% that encourages rotation of the rotor 110 with respect to the angled flat plate 190.

However, the angled flat plate 190 includes multiple detriments. The first of which is that the minimum magnetic gap 160 must be taken from the closest position between the magnet face 123 and the angled flat plate face 192, the distance between the magnets and the plate increasing toward the shaft 204 due to the angle Θ. This is less efficient than having the plate be parallel to the magnet face 123 because the first magnet set 122 is effectively further away from the angled flat plate 190 due to the angle.

The combination of manufacturing tolerances and magnetic interaction set the minimum magnetic gap 160 and the maximum magnetic gap 162. For practical purposes, for magnets able to be handled by hand, the maximum magnetic gap is approximately 1 to 1.25 inches. The minimum magnetic gap 160 is approximately 0.25 inches. Operating with smaller gaps would increase the magnetic forces but would risk contact between the rotating and static parts during operation.

The angles shown in FIG. 7 are exaggerated for clarity. Additionally, for clarity the rotational force 152 is drawn pointing toward the shaft 204, where it is in fact directed into the page, perpendicular to the shaft 204.

Figure 8:
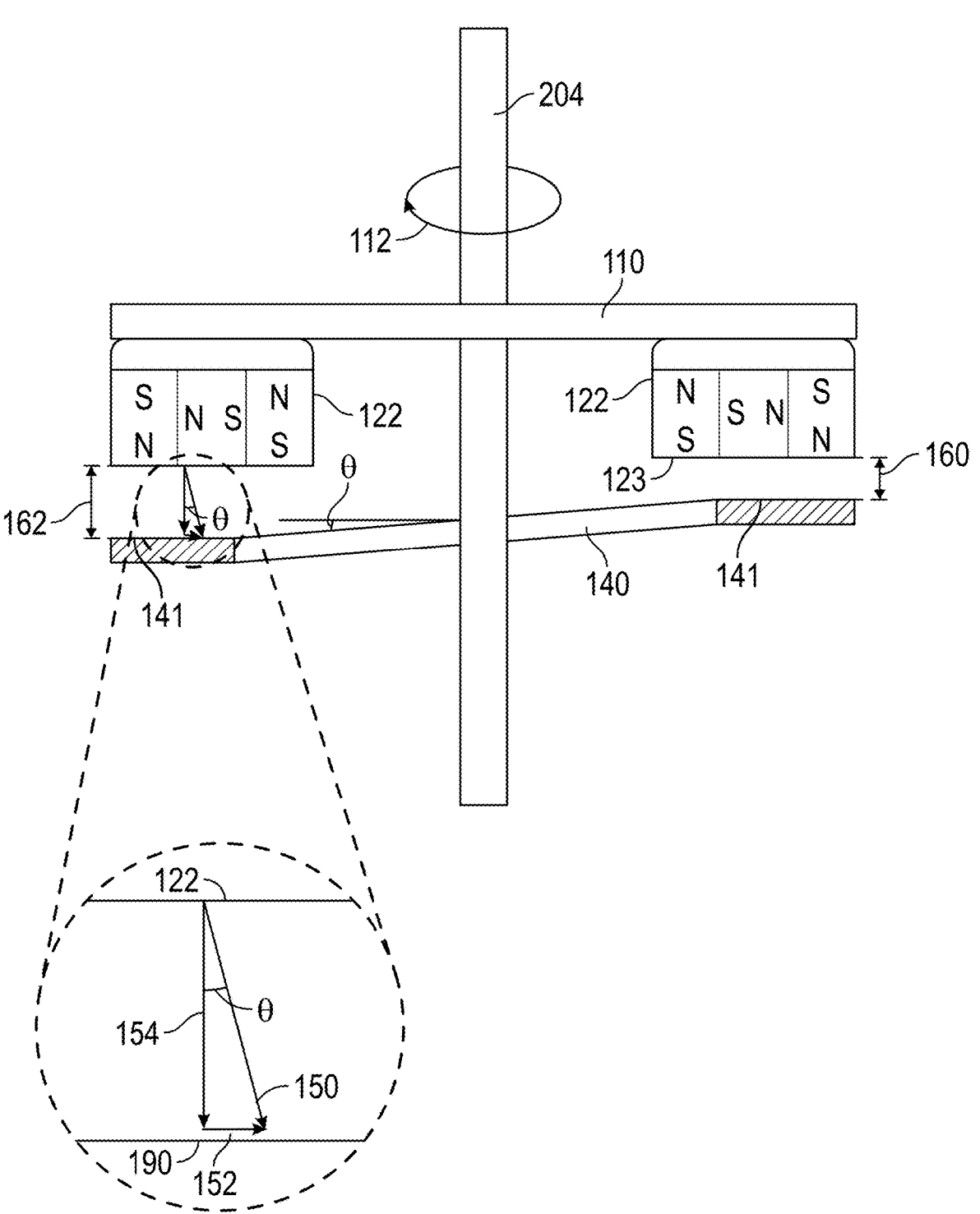
FIG. 8 illustrates a cross-section with a static spiral plate of the torque augmentation apparatus.

Referring to FIG. 8, a cross-section with a static spiral plate of the torque augmentation apparatus is shown.

The rotor 110 is again supported by the shaft 204, moving in rotor rotation direction 112. The angled flat plate 190 has been replaced by static spiral plate 140 with static spiral plate face 141. The static spiral plate 140 is shaped such that the static spiral plate face 141 is parallel to the magnet face 123. The result is the minimum magnetic gap 160 is held consistently across the face of the first magnets at 122, increasing the force generated by the interaction between the magnets and the ferrous plate.

Again, dividing force toward plate 150 into its component parts results in rotational force 152 and attractive force 154. Using Θ as 4° in this example, rotational force 152 is approximately 7% of the force toward plate 150. In other words, the force between the first magnet set 122 and the angled flat plate 190 includes a component of approximately 7% that encourages rotation of the rotor 110 with respect to the angled flat plate 190. It is noted that the calculation is the same as for the angled flat plate of FIG. 7, although the value of force toward plate 150 is likely greater due to the parallel nature between the spiral static plate face 141 and the magnet face 123 and the decrease in distance between the magnet face 123 and static plate face 141.

The angles shown in FIG. 8 are exaggerated for clarity. Additionally, for clarity the rotational force 152 is drawn pointing toward the shaft 204, where it is in fact directed into the page, perpendicular to the shaft 204.

Figure 9:
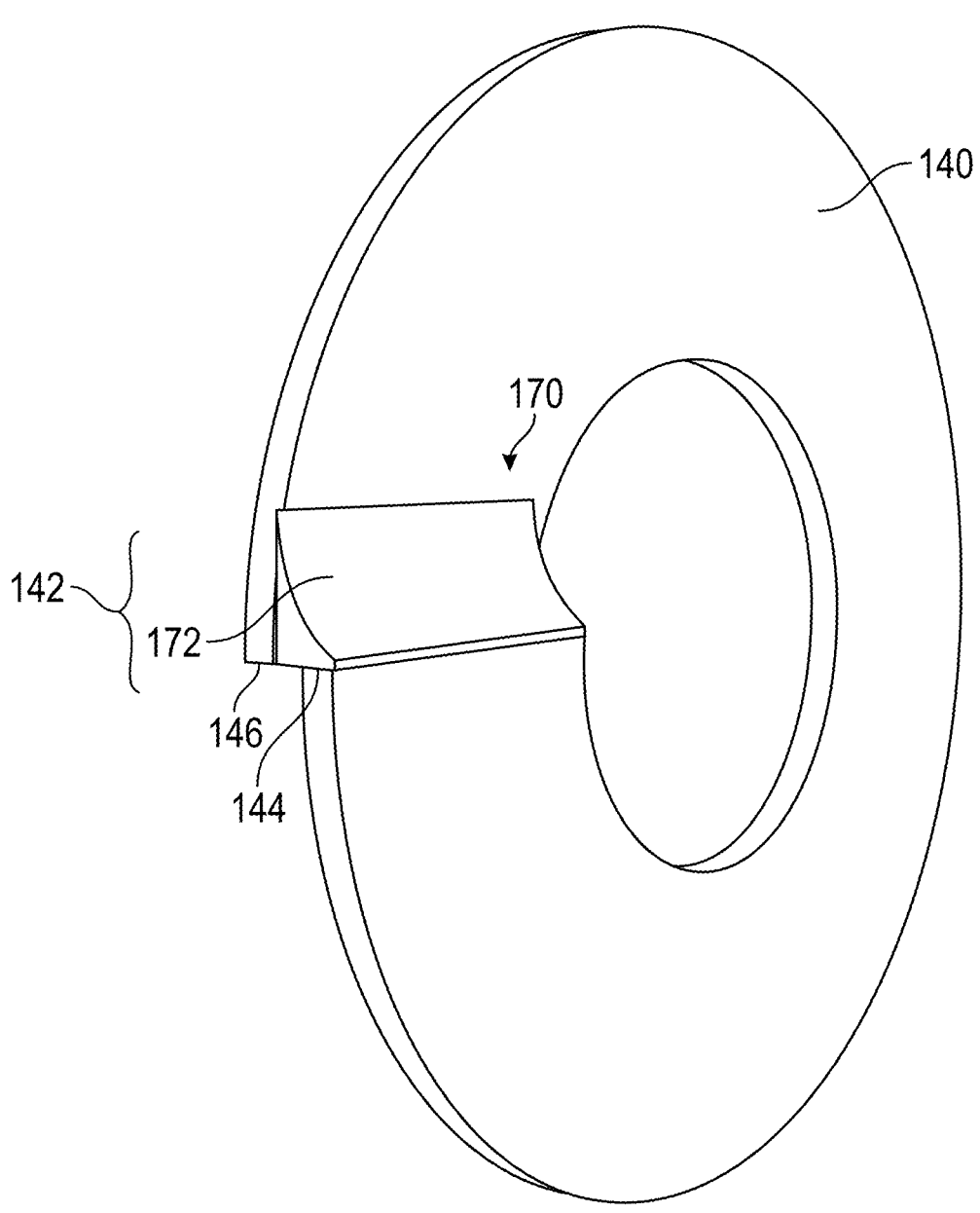
FIG. 9 illustrates a view of the spiral plate with ramp of the torque augmentation apparatus.
Figure 10:
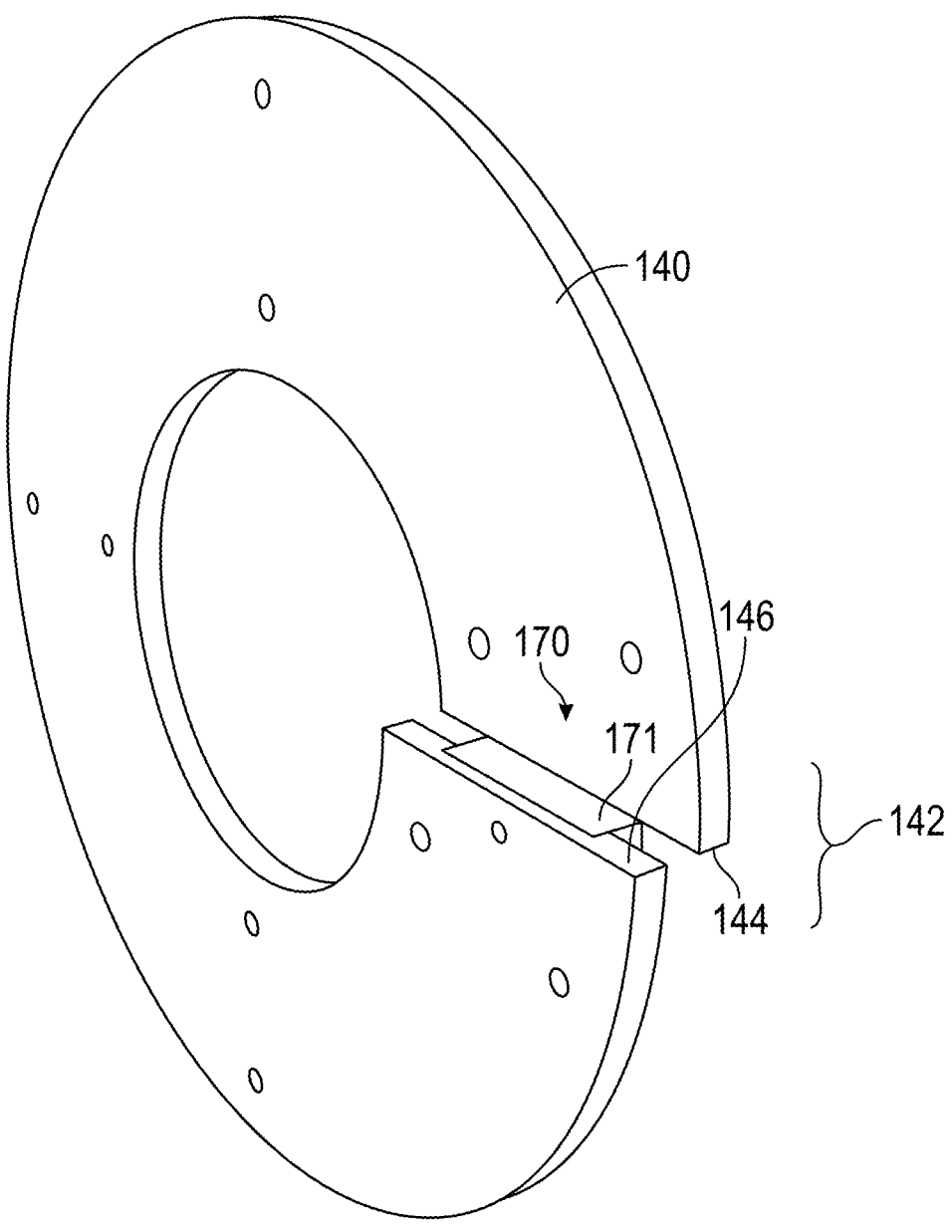
FIG. 10 illustrates a view of the spiral plate with magnet of the torque augmentation apparatus.

Referring to FIGS. 9 and 10, a view of the spiral plate with two embodiments of the exit diversion of the torque augmentation apparatus are shown.

The exit diversion 170 options include exit diversion magnets 171 and exit diversion ramp 172.

In FIG. 9, the static spiral plate 140 is shown with an exit diversion ramp 172, bridging the plate discontinuity 142 between the exit end 144 and the entrance end 146.

In FIG. 10, the static spiral plate 140 is shown with exit diversion magnets 171, bridging the plate discontinuity 142 between the exit end 144 and the entrance end 146.

Figure 11:
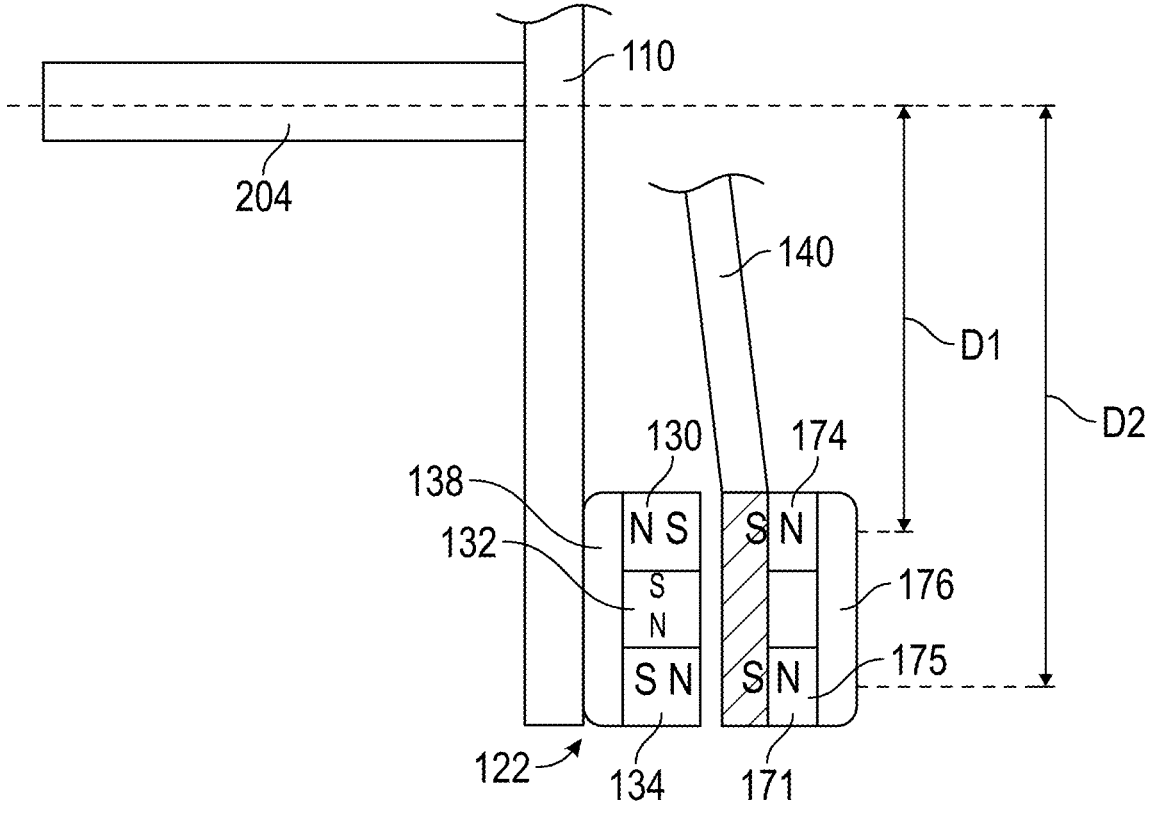
FIG. 11 illustrates a detailed view of the exit diversion and static spiral plate of the torque augmentation apparatus.

Referring to FIG. 11, a detailed view of the exit diversion and static spiral plate of the torque augmentation apparatus is shown.

The rotor 110 is supported by the shaft 204. The first magnet set 122 is shown formed from magnet one 130, magnet two 132, and magnet three 134 affixed to support plate 138.

The orientation of the figure shows the first magnet set 122 crossing the plate discontinuity 142 and interacting with the exit diversion magnets at 171. Specifically, diversion magnet one 174 and diversion magnet two 175 affixed to the support plate 176.

The goal of the exit diversion magnets 171 is to neutralize the interaction between the first magnet set 122 and the static spiral plate 140 as the first magnet set 122 crosses the plate discontinuity 142. Neutralizing their magnetic interaction is accomplished by the exit diversion magnets 171 interfering with magnetic field between the first magnets at 122 and static spiral plate 140. In this embodiment, this includes orienting magnet one 130 in a repelling configuration with respect to diversion magnet one 174, where the South poles are facing each other. Diversion magnet two 175 is set up in an attractive position with respect to magnet three 134, the goal being to create a neutralizing effect.

It is noted that due to the circular nature of this device, $D_1$, the radius at which diversion magnet one 174 is placed, is less than $D_2$, the radius at which diversion magnet two 175 is placed. Given these differing distances, and therefore differing lever arms, there are effects on the torque resulting from having these magnets at these different locations.

Figure 12:
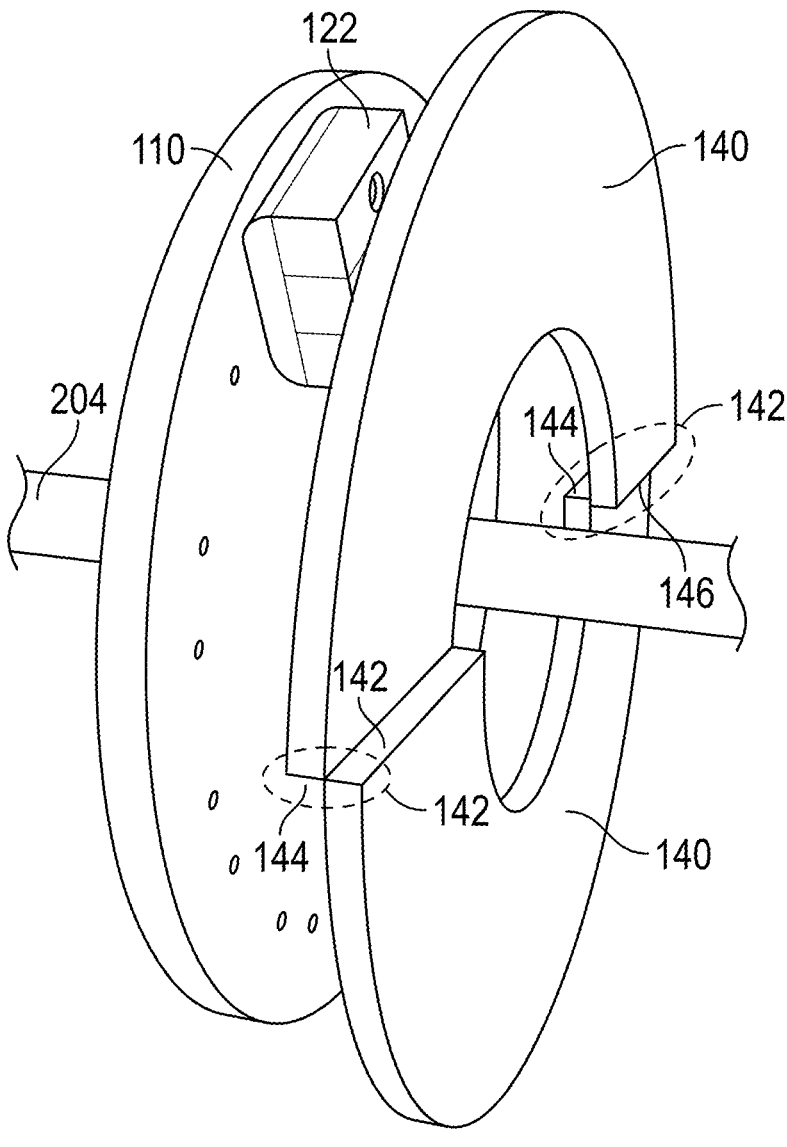
FIG. 12 illustrates an alternative embodiment of the static spiral plate of the torque augmentation apparatus.

Referring to FIG. 12, an alternative embodiment of the static spiral plate of the torque augmentation apparatus is shown.

Rotor 110 is supported by the shaft 204, the rotor shown with one typical first magnet set 122. The static spiral plate 140 is divided into two halves, each half including a plate discontinuity 142 with an exit end 144 and an entrance end 146. Separating this spiral plate 140 into separate pieces allows for the use of a more aggressive angle Θ (see FIG. 8) because the minimum magnetic gap 160 and the maximum magnetic gap 162 (see FIG. 8) are separated by only 180° as opposed to 360°. However, the system now has two plate discontinuities 142 rather than only one, resulting in additional drag on the rotor 110 as each first magnet set 122 crosses each plate discontinuity 142.

Figure 13:
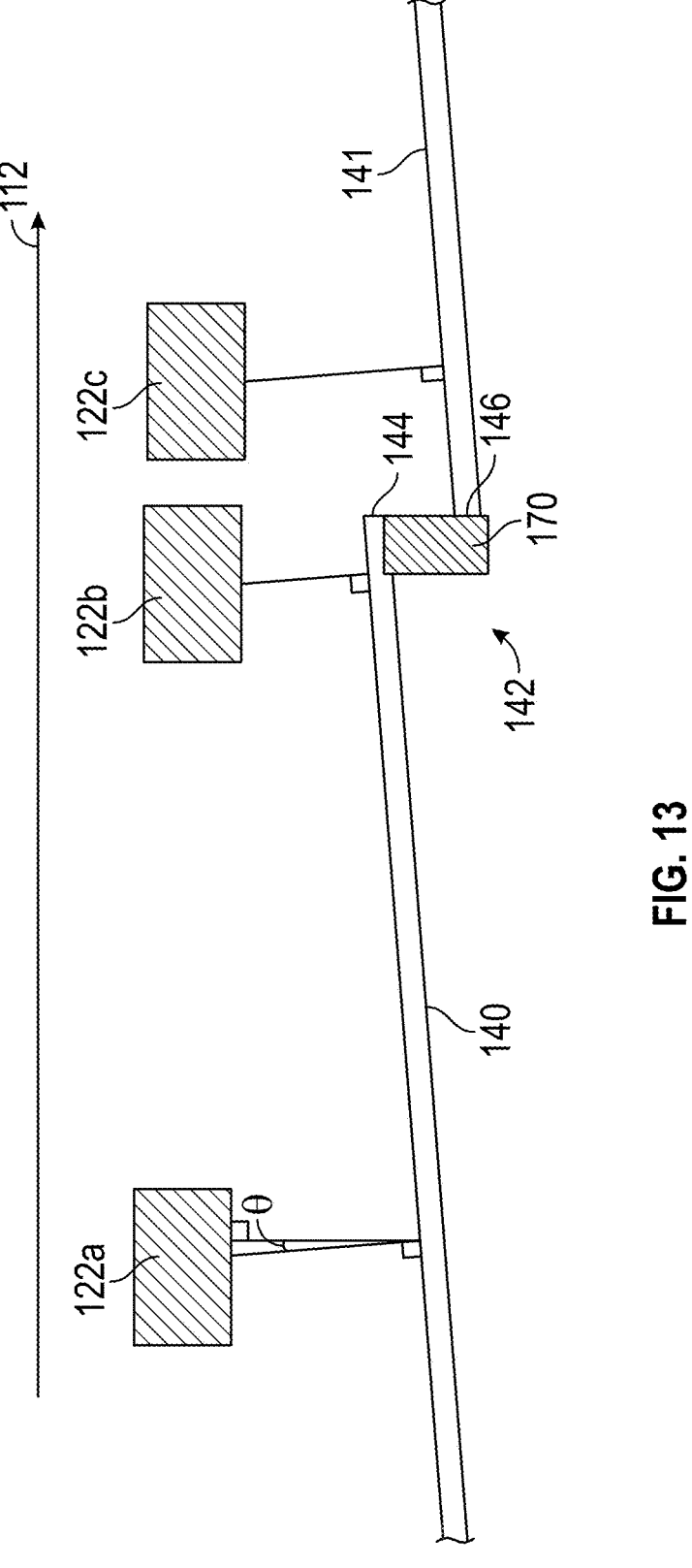
FIG. 13 illustrates a diagram of the interactions between the static spiral plate and the magnets of the torque augmentation apparatus.

Referring to FIG. 13, a force diagram of the torque augmentation apparatus is shown.

The first magnet set 122 is shown in multiple positions, as first magnet set 122a, 122b, and 122c. The static spiral plate 140 is shown in a linear form, as though it has been unwrapped, for ease of description. Additionally, the static spiral plate 140 viewed from the inside looking out, as though viewed from the rotor 110. The result is that the static spiral plate 140 appears to be at an angle, as opposed to the parallel orientation shown in FIG. 8.

The static spiral plate 140 is shown with static spiral plate face 141, and a plate discontinuity 142 formed from an exit end 144 and an entrance end 146.

As the first magnet set 122 moves along its straight-line path in rotor rotation direction 112, the distance between the first magnet set 122 and the static spiral plate 140 changes depending on position. For example, first magnet set 122a is in a further position from the static spiral plate 140 than first magnet set 122b.

As the first magnet set 122b crosses the exit end 144, passing from the second end to the first end of the static spiral plate 140, it optionally crosses the exit diversion 170. The exit diversion 170 compensates for the discontinuity in the magnetic field, reducing the loss at the transition.

Figure 14:
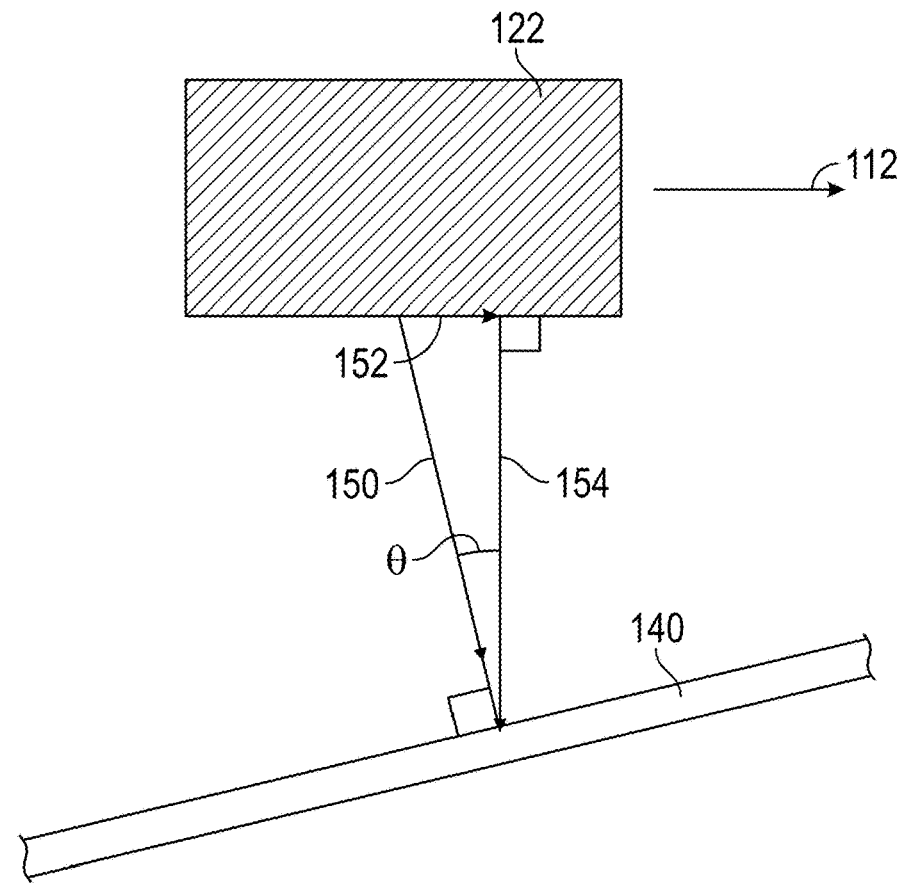
FIG. 14 illustrates a second diagram of the interactions between the static spiral plate and the magnets of the torque augmentation apparatus.

Referring to FIG. 14, a second force diagram of the torque augmentation apparatus is shown.

While angle Θ is 4° in the preferred embodiment, for the purposes of illustration this angle has been exaggerated. Angles within the range of greater than 0° to 20° are anticipated.

An attractive force exists between the magnets at 122 and the static spiral plate 140, shown as force toward plate 150. Based on angle Θ, the force toward plate 150 is divided into a rotational force 152 and an attractive force 154.

The rotational force 152 creates a torque on the rotor 110. The attractive force 154 draws the first magnets at 122 toward the static spiral plate 140.

Changing the angle Θ affects the division of the force toward plate 150 between the rotational force 152 and the attractive force 154. A greater angle Θ results in a proportionally increased rotational force 152 comma but increases the distance between the entrance and the exit end of the static spiral plate 140, increasing the maximum distance between the first magnets at 122 and static spiral plate 140 and therefore decreasing the force toward plate 150. As a result, choosing the appropriate value for Θ is a balance. In the preferred embodiment, the angle is 4 degrees.

Figure 15:
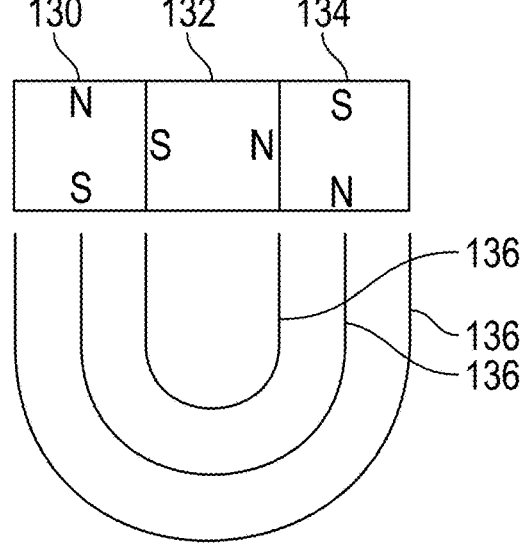
FIG. 15 illustrates a diagram of the Halbach magnet arrangement of the torque augmentation apparatus.

Referring to FIG. 15, a view of the Halbach magnetic field diagram of the torque augmentation apparatus is shown.

Magnet one 130, magnet two 132, and magnet three 134 are oriented as shown, resulting in flux lines 136.

Figure 16:
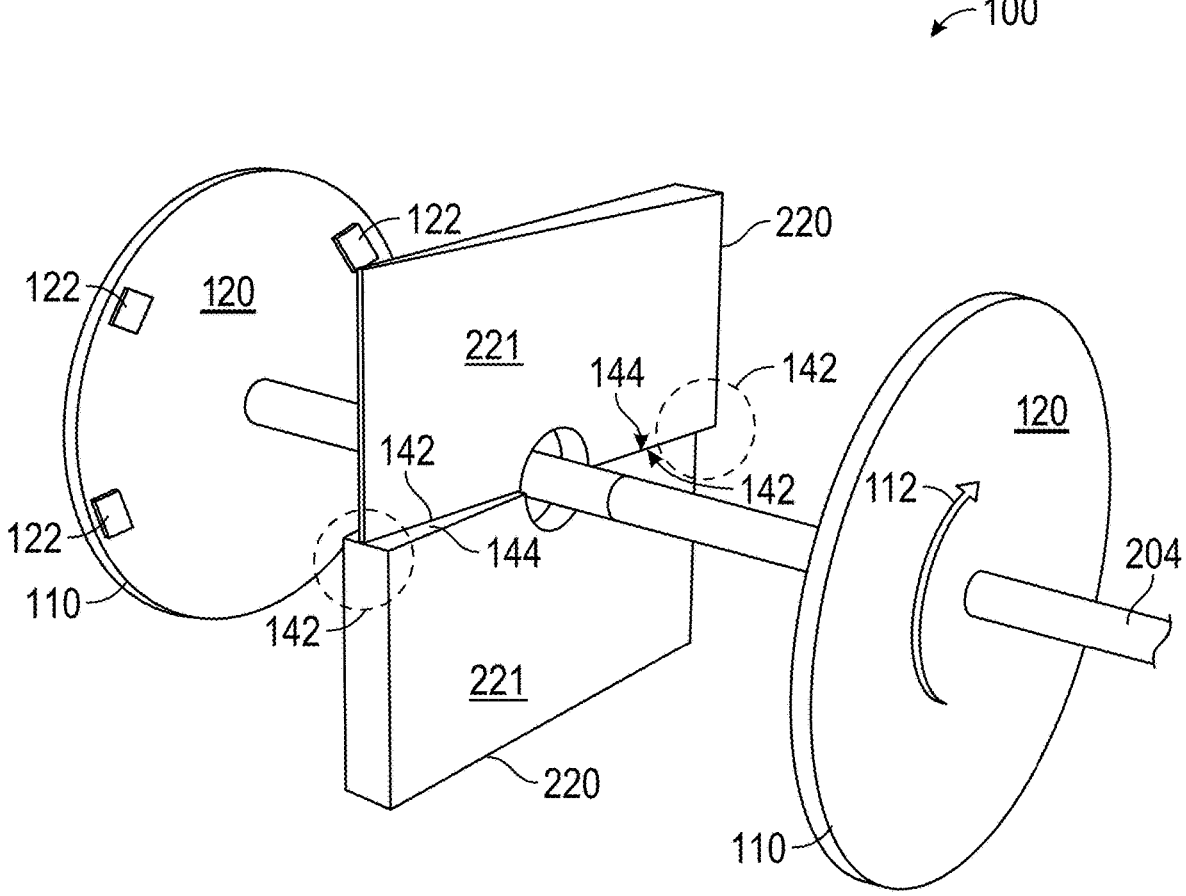
FIG. 16 illustrates an alternative embodiment, using tapered plates, of the torque augmentation apparatus.

Referring to FIG. 16, an alternative embodiment, using tapered plates, is shown.

While the preferred embodiment of the torque augmentation apparatus 100 includes a static spiral plate 140 (see FIG. 2), for simplicity of construction, the apparatus may also be constructed using tapered flat plates 220. Again there is one or more rotor 110 moving in rotor rotation direction 112 about a shaft 204.

The tapered flat plate faces 221 are set at non-parallel angle with respect to the first face 120 of the rotor 110. For example, an angle of 4°. Angles within the range of greater than 0° to 20° are anticipated.

The tapered flat plates 220 are separated by plate discontinuities 142 that each include an exit end 144 and an entrance end 146.

In alternative embodiments, the tapered plates are divided across alternative angles. For example, rather than a 180° separation, 90° separation or 45° separation are anticipated.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction, and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A device for enhancing rotational torque, comprising:
a shaft;
a rotor rotationally connected to the shaft and oriented perpendicular to the shaft;
a plurality of magnets disposed on the rotor;
a magnetic diversion plate, with a magnetic diversion plate face, positioned adjacent to the rotor with the plurality of magnets;
    the magnetic diversion plate having an exit end where the magnetic diversion plate is furthest from the rotor;
    the magnetic diversion plate having an entrance end where the magnetic diversion plate is closest to the rotor;
wherein interaction between the plurality of magnets and the magnetic diversion plate contributes torque to a rotational system; and
wherein the magnetic diversion plate is a flat plate set with a flat plate face set at an angle of between one and ten degrees with respect to a face of the rotor.

2. The device for enhancing rotational torque of claim 1, wherein:
the magnetic diversion plate is a spiral-shaped plate.

3. The device for enhancing rotational torque of claim 1, wherein:
from a perspective of a magnet of the plurality of magnets, the magnetic diversion plate face is continually moving toward the magnet as the rotor rotates, with an exception of a plate discontinuity, where the magnetic diversion plate face resets to a position further away from the magnet.

4. The device for enhancing rotational torque of claim 3, further comprising:
an exit diversion;
    the exit diversion at the plate discontinuity;
    the exit diversion acting to transition a magnetic field created by the plurality of magnets on the rotor from the exit end to the entrance end of the magnetic diversion plate.

5. The device for enhancing rotational torque of claim 4, wherein:
the exit diversion includes a curved surface that transitions from the magnetic diversion plate face at the exit end to the magnetic diversion plate face at the entrance end.

6. The device for enhancing rotational torque of claim 4, wherein:
the exit diversion includes two magnets.

7. The device for enhancing rotational torque of claim 1, wherein:
as the rotor rotates, the magnetic diversion plate face continually moves closer to a given magnet set of the plurality of magnets, but for a point where the given magnet set crosses a plate discontinuity, where the magnetic diversion plate face returns to its furthest position.

8. An apparatus for contributing torque to a rotational system comprising:
a shaft;
a rotor mounted to the shaft;
one or more magnets placed on a face of the rotor;
a static spiral plate with a spiral plate face;
    the spiral plate face set at an angle (with respect to a face of the rotor;
    the static spiral plate including an exit end and an entrance end;
        a plate discontinuity, or gap in the static spiral plate, existing between the exit end and the entrance end;
        the one or more magnets, during rotation of the rotor, passing closer to the exit end than to the entrance end;
    the one or more magnets of the rotor interacting with the static spiral plate as the rotor rotates.

9. The apparatus for contributing torque to a rotational system of claim 8, wherein:
from a perspective of a magnet of the one or more magnets, the spiral plate face is continually moving toward the magnet as the rotor rotates, with an exception of the plate discontinuity, where the spiral plate face resets in position away from the magnet.

10. The apparatus for contributing torque to a rotational system of claim 8, wherein:
as the rotor rotates, the spiral plate face continually moves closer to a given magnet set of the one or more magnets, but for a point where the given magnet set crosses the plate discontinuity, where the spiral plate face returns to its furthest position.

11. The apparatus for contributing torque to a rotational system of claim 8, further comprising:
an exit diversion;
    the exit diversion at the plate discontinuity;
    the exit diversion acting to transition a magnetic field created by the one or more magnets on the rotor from the exit end to the entrance end of the static spiral plate.

12. The apparatus for contributing torque to a rotational system of claim 11, wherein:
the exit diversion includes a curved surface that transitions from spiral plate face at the exit end to the spiral plate face at the entrance end.

13. The apparatus for contributing torque to a rotational system of claim 12, wherein:
the exit diversion includes two magnets.

14. A device to contribute torque to a rotating system comprising:
a disc-shaped rotor connected to a shaft;
a plurality of magnets disposed on the disc-shaped rotor;
a fixed spiral-shaped diversion plate positioned adjacent to the disc-shaped rotor;
    the fixed spiral-shaped diversion plate having a diversion plate face;
        the diversion plate face having a plate discontinuity between an exit end that is closest to the disc-shaped rotor and an entrance end that is furthest from the disc-shaped rotor;
wherein magnetic fields from the plurality of magnets interact with the fixed spiral-shaped diversion plate as the disc-shaped rotor rotates.

15. The device to contribute torque to a rotating system of claim 14, wherein:

from a perspective of a magnet of the plurality of magnets, the diversion plate face is continually moving toward the magnet as the disc-shaped rotor rotates, with an exception of at the plate discontinuity, where the diversion plate face resets in position away from the magnet.

16. The device to contribute torque to a rotating system of claim 14, wherein:

as the disc-shaped rotor rotates, the diversion plate face continually moves closer to a given magnet set of the plurality of magnets, but for a point where the given magnet set crosses the plate discontinuity, where the diversion plate face returns to its furthest position.

17. The device to contribute torque to a rotating system of claim 14, further comprising:

an exit diversion;

the exit diversion at the plate discontinuity;

the exit diversion acting to transition a magnetic field created by the plurality of magnets on the disc-shaped rotor from the exit end to the entrance end of the fixed spiral-shaped diversion plate.

18. The device to contribute torque to a rotating system of claim 17, wherein:

the exit diversion includes a curved surface that transitions from the diversion plate face at the exit end to the diversion plate face at the entrance end.

19. The device to contribute torque to a rotating system of claim 18, wherein:

the exit diversion includes two magnets.

\* \* \* \* \*